(12) United States Patent
House et al.

(10) Patent No.: US 6,212,673 B1
(45) Date of Patent: Apr. 3, 2001

(54) COMPONENT-NEUTRAL BUILDER INTERFACE

(75) Inventors: Daniel Edward House; Brian Joseph Owings, both of San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 08/928,358

(22) Filed: Sep. 12, 1997

Related U.S. Application Data

(63) Continuation-in-part of application No. 08/828,481, filed on Mar. 31, 1997, which is a continuation-in-part of application No. 08/828,854, filed on Mar. 31, 1997, which is a continuation-in-part of application No. 08/828,476, filed on Mar. 31, 1997, which is a continuation-in-part of application No. 08/828,480, filed on Mar. 31, 1997, which is a continuation-in-part of application No. 08/828,989, filed on Mar. 31, 1997, which is a continuation-in-part of application No. 08/828,479, filed on Mar. 31, 1997, which is a continuation-in-part of application No. 08/828,990, filed on Mar. 31, 1997, which is a continuation-in-part of application No. 08/828,890, filed on Mar. 31, 1997, which is a continuation-in-part of application No. 08/828,897, filed on Mar. 31, 1997, which is a continuation-in-part of application No. 08/828,479, filed on Mar. 31, 1997, which is a continuation-in-part of application No. 08/828,477, filed on Mar. 31, 1997, which is a continuation-in-part of application No. 08/829,104, filed on Mar. 31, 1997, which is a continuation-in-part of application No. 08/928,620, filed on Sep. 12, 1997, which is a continuation-in-part of application No. 08/928,621, filed on Sep. 12, 1997.

(51) Int. Cl.$^7$ .................................................. G06F 9/45
(52) U.S. Cl. .................. 717/1; 717/1; 717/9; 717/12
(58) Field of Search ........................... 395/701, 712; 364/280; 717/1, 9, 12

(56) References Cited

U.S. PATENT DOCUMENTS 5,247,681 * 9/1993 Janis et al. .......................... 709/305
5,375,241 * 12/1994 Walsh .................................. 709/305
5,758,160 * 5/1998 McInerney et al. ................. 395/701
5,784,553 * 7/1998 Kolawa et al. ........................ 714/38
5,787,431 * 7/1998 Shaughnessy ....................... 707/100
5,897,642 * 4/1999 Capossela et al. .................. 707/203
6,035,121 * 6/2000 Chiu et al. .............................. 717/5
6,071,317 * 6/2000 Nagel ..................................... 717/4

(List continued on next page.)

OTHER PUBLICATIONS

Srivastva, Unreadable procedure in object oriented programming, ACM prog. languages and systems, vol. 1, No. 4, pp. 355–364, Dec. 1992.*

(List continued on next page.)

*Primary Examiner*—Mark R. Powell
*Assistant Examiner*—Anil Khatri
(74) *Attorney, Agent, or Firm*—Gates & Cooper

(57) ABSTRACT

A method, apparatus, and article of manufacture and memory for a component neutral builder interface. The interface comprises a dynamic link library (DLL) stored in the memory of and executable by a computer that is communicatively coupled to the user-definable component and the build utility, and a program interface implemented in the DLL which enforces an interface protocol between the component and the utility having a command set including all interface commands for the user-definable component. In this invention, the instruction set for implementing the component functions can reside in the DLL itself, an external component, or can be shared between the DLL and the external component. A method of implementing a user-definable component in a build utility is also disclosed. The method comprises the steps of invoking a DLL when a user-definable component associated with the DLL is selected from a build utility, reading user-definable component data from the user-definable component via the DLL, and implementing the user-definable component in the build utility in accordance with the user-definable component data.

19 Claims, 6 Drawing Sheets

U.S. PATENT DOCUMENTS

| | | | | |
|---|---|---|---|---|
| 6,110,226 | * | 8/2000 | Bothner | 717/7 |
| 6,117,186 | * | 9/2000 | Wydall et al. | 717/9 |
| 6,123,737 | * | 9/2000 | Sadowsky | 717/11 |
| 6,128,652 | * | 10/2000 | Toh et al. | 709/219 |

OTHER PUBLICATIONS

Johnson et al, "Building an evolution transfromation library", IEEE, pp. 238–248, 1990.*

Edelson, "A mark and sweep collector fro C++", ACM, pp. 51–58, Dec. 1992.*

Lynch et al "An interface for rapid prototyping and evolutinary support of databse intensive applications", IEEE pp. 344–348, 1989.*

Son et al, "A component based client server application devlopment environment using Java", IEEE 168–179, 1998.*

Rapley, RAD or TRAD or both the future of software development, IEEE, pp. 1–2, 1995.*

Mortimer, "Project mangement in rapid application development", IEEE, pp. 1–3, 1995.*

Doubleday et al, "Building distributed Ada applications from specifications and functional components", ACM pp. 143–154, Jul. 1991.*

Ivor Horton, Beginning Visual C++ 5, Wrox Pub. Inc, Mar. 1997.*

* cited by examiner

COMPONENT-NEUTRAL BUILDER INTERFACE

RELATED APPLICATIONS

This application is a continuation-in-part of the following co-pending and commonly-assigned applications:

Application Ser. No. 08/828,481, entitled "MULTI-TIER DEBUGGING," filed Mar. 31, 1997, by Daniel E. House and Constance J. Nelin;

Application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," filed Mar. 31,1997, by Daniel E. House, Brian J. Owings, and Shiau-Shiau Pei;

Application Ser. No. 08/828,476, entitled "METHOD, APPARATUS, AND PROGRAM STORAGE DEVICE FOR SHARING OBJECTS WITH A NETWORK SERVER AND A DATABASE SERVER USING A COMMON OBJECT MODEL," filed Mar. 31, 1997, by Daniel E. House, Brian J. Owings, and Shiau-Shiau Pei, issued Mar. 30, 1999 as U.S. Pat. No. 5,890,158;

Application Ser. No. 08/828,480, entitled "REMOTE SCRIPTING OF LOCAL OBJECTS," filed Mar. 31, 1997, by Daniel E. House, Constance J. Nelin, and Rebecca B. Nin;

Application Ser. No. 08/828,989, entitled "SIMULATING A MULTI-TIERED COMPUTER ENVIRONMENT ON A SINGLE DEVELOPMENT SYSTEM FOR DEBUGGING," filed Mar. 31, 1997, by Daniel E. House and Constance J. Nelin, issued Aug. 17, 1999 as U.S. Pat. No. 5,940,953; Application Ser. No. 08/828,478, entitled "MULTI-TIER VIEW PROJECT WINDOW," filed Mar. 31, 1997, by Howard J. Glaser, Daniel E. House, and Constance J. Nelin, issued Sep. 14, 1999 as U.S. Pat. No. 5,953,525;

Application Ser. No. 08/828,846, entitled "SHARED MODULES GRAPHICAL USER INTERFACE," filed Mar. 31, 1997, by Howard J. Glaser, Daniel E. House, and Constance J. Nelin, isued Sep. 21, 1999 as U.S. Pat. No. 5,956,036; and Application Ser. No. 08/828,990, entitled "MAKING A CONTROL AVAILABLE TO A COMPUTER WITHOUT INSTALLING THE CONTROL" filed Mar. 31, 1997, by Daniel E. House and Constance J. Nelin, issued Feb. 23, 1999 as U.S. Pat. No. 5,875,322, all of which applications are incorporated by reference herein.

This application is also related to the following co-pending and commonly assigned patent applications:

Application Ser. No. 08/828,890, entitled "HTML INTEGRATION UTILITY FOR A PROGRAM DEVELOPMENT ENVIRONMENT," filed Mar. 31, 1997, by Howard J. Glaser;

Application Ser. No. 08/828,897, entitled "EXTENDER SMART GUIDE," filed Mar. 31, 1997, by Howard J. Glaser;

Application Ser. No. 08/828,479, entitled "QUERY SELECTION FOR A PROGRAM DEVELOPMENT ENVIRONMENT," filed Mar. 31, 1997, by Howard J. Glaser and Mary C. Lehner;

Application Ser. No. 08/828,477, entitled "DOCKING AND FLOATING MENU/TOOL BAR," filed Mar. 31, 1997, by Howard J. Glaser, Karl D. Johnson, and Stewart E. Nickolas;

Application Ser. No. 08/829,104, entitled "EXTENDER USER INTERFACE," filed Mar. 31, 1997, by Thomas E. Conrad, Howard J. Glaser, Jean C. Ho, James L. Keesey, Constance J. Nelin, and Gerald J. Wilmot;

Application Ser. No. 08/928,620, entitled "STORING P-CODE IN A DATABASE," filed on same date herewith, by Curt L. Cotner, Wendy L. Koontz, Gerald H. Roth, Frederick T. Sharp and Shu-Huar J. Yeh;

Application Ser. No. 08/928,621, entitled "DYNAMICALLY DEBUGGING USER-DEFINED FUNCTIONS AND STORED PROCEDURES," filed on same date herewith, by Constance J. Nelin, Jerry H. Roth, Frederick T. Sharp, and Shu-Huar J. Yeh;

all of which applications are hereby incorporated by reference herein.

BACKGROUND OF THE INVENTION

1. Field of the Invention

This invention relates in general to programming development environments performed by computers, and in particular, to the use of a dynamic debugging tool usable in a programming development environment for Internet and Intranet applications.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American National Standards Organization (ANSI) and the International Standards Organization (ISO). Thus, there is a need in the art for methods of accessing RDBMS software across an Internet or Intranet, and especially via Web-based networks.

Simplified development environments for such methods and systems implementing them are also desirable. For example, the visual builder disclosed herein allows visual placement of components (also called controls) on forms. These visual components are usually of one specific type, such as JAVA Applets, OpenDoc parts, or Active-X components, or custom types such as Visual Basic Extension (VBX) components. For maximum flexibility, it is desirable to have components of any type available to the builder to design forms. However, in current systems, this flexible functionality is impeded by the fact that of component types each have particular interface characteristics which are generally different from other component types. There is a need, therefore, for a development capability which supports integration of a wide-variety of user-definable components with different interface characteristics. The present invention satisfies that need.

SUMMARY OF THE INVENTION

To overcome the limitations in the prior art described above, and to overcome other limitations that will become apparent upon reading and understanding the present specification, the present invention discloses a component neutral builder interface.

The interface comprises a dynamic link library (DLL) stored in the memory of and executable by a computer that is communicatively coupled to the user-definable component and the build utility, and a program interface implemented in the DLL which enforces an interface protocol between the component and the utility which has a command set including all interface commands for the user-definable component. In this invention, the instruction set for implementing the component functions can reside in the DLL itself, an external component, or can be shared between the DLL and the external component. A method of implementing a user-definable component in a build utility is also disclosed. The method comprises the steps of invoking a DLL when a user-definable component associated with the DLL is selected from a build utility, reading user-definable component data from the user-definable component via the DLL, and implementing the user-definable component in the build utility in accordance with the user-definable component data.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
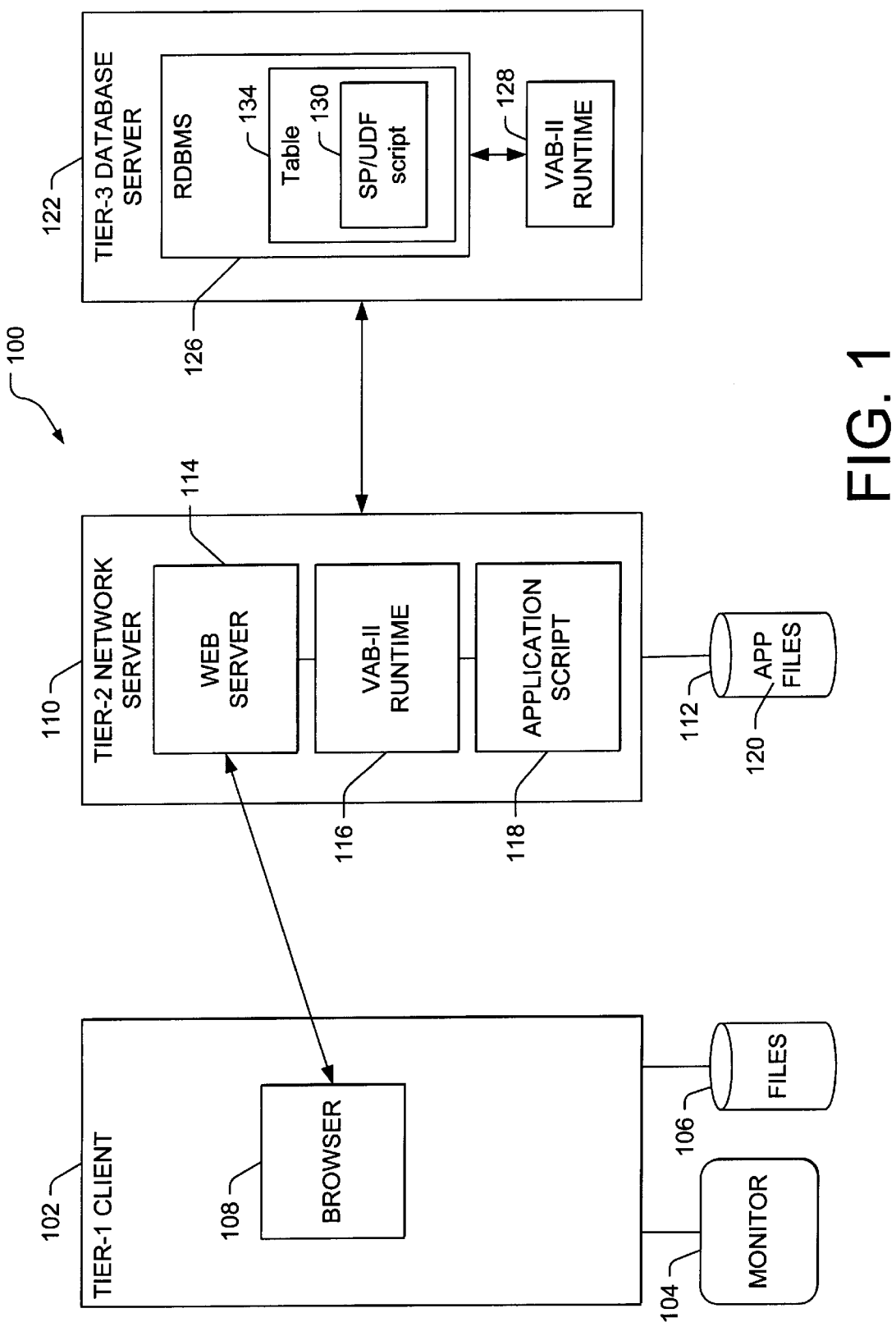
FIG. 1 is a block diagram that illustrates a three tier architecture of one embodiment of the execution time of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and zero or more data storage devices 106. In one embodiment, the client computer 102 executes a browser 108 capable of containing and executing applets, such as MICROSOFT Internet Explorer or NETSCAPE Navigator. The browser 108 communicates with programs on other tiers through HTTP (Hypertext Transfer Protocol).

The second tier comprises a network server 110 having one or more data storage devices 112. In one embodiment, the network server 110 executes a plurality of computer programs including a web server 114, a persistent Visual Age Basic II (VAB-II) runtime module 116, and one or more application scripts 118 retrieved from an APP file 120 stored on a data storage device 112. The web server 114 (such as IBM, MICROSOFT, or NETSCAPE HTTP daemons) communicates with the browser 108 via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include basic programming instructions, Java, ActiveX, or DLL applet controls, embedded SQL, and other mechanisms known in the art.

The third tier comprises a database server 122 having one or more data storage devices 124 connected thereto. In one embodiment, the database server executes a plurality of computer programs including a relational database management system (RDBMS) 126, a persistent or non persistent (demand loaded) VAB-II runtime module 128, and stored procedure (SP) and user defined function (UDF) scripts 130 retrieved from a table 134 maintained in the RDBMS 126. The SP/UDFs can be stored in the form of p-code or source files. P-code is compiled script code which is then interpreted by an interpreter. In one embodiment, p-code is an optimized intermediate code for a BASIC interpreter that runs faster and more safely than interpreting and running the source code. Running p-code for a server routine allows encapsulation of database authorization for embedded static SQLs, which are statements embedded within a program that are prepared during the program preparation process before the program is executed. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF script 130, which may consist of p-code or source code, or any interpretable code. The SP/UDF scripts 130 comprise programming logic for accessing the database via the RDBMS 126 and communicating with the tier-2 computer programs through the RDBMS 126.

Figure 2:
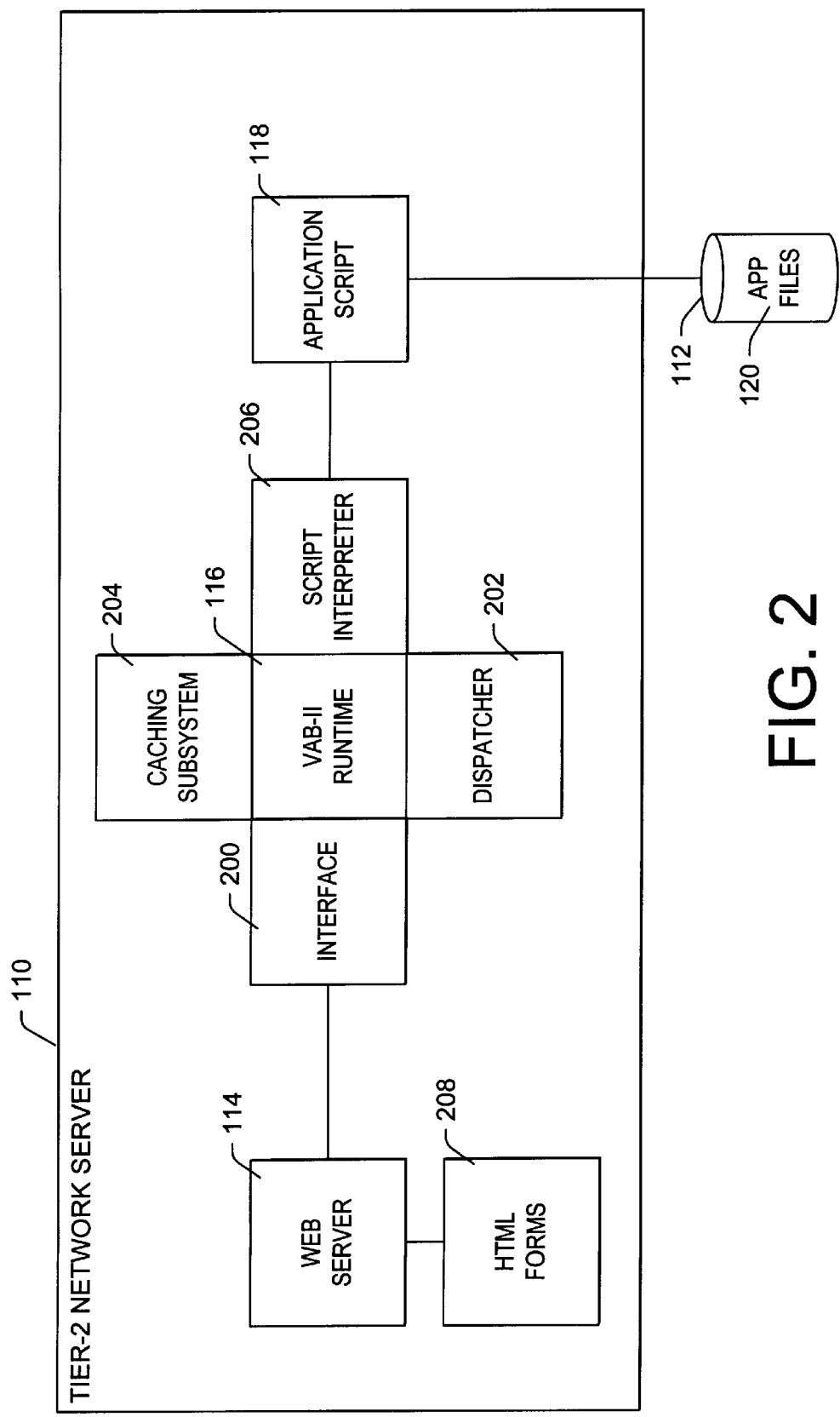
FIG. 2 is a block diagram that further illustrates the components of the network server in one embodiment of the execution time of the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), NETSCAPE Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
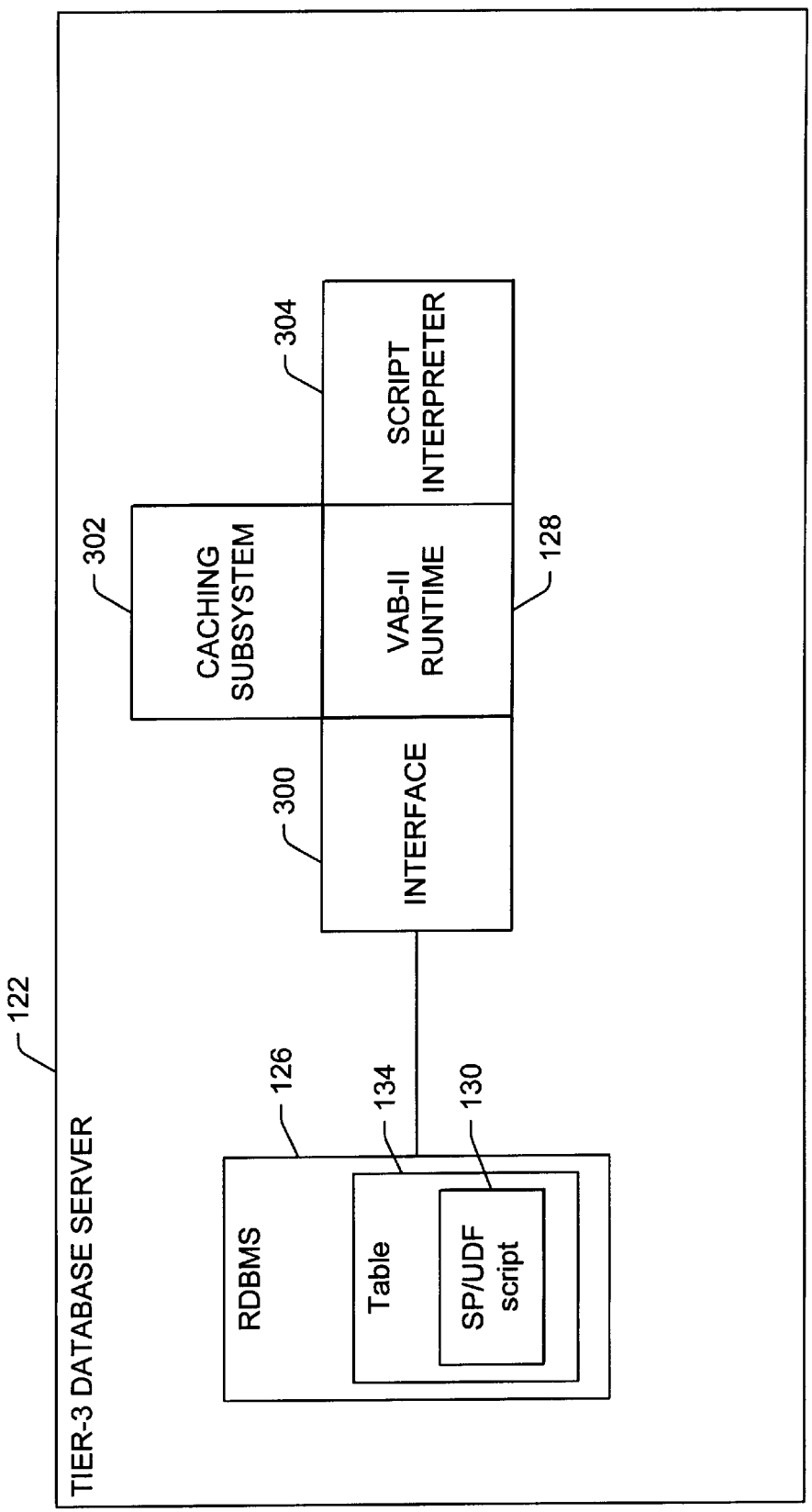
FIG. 3 is a block diagram that further illustrates the components of the database server in one embodiment of the present invention.

FIG. 3 is a block diagram that further illustrates the components of the database server 122 in the present invention. The VAB-II runtime module 128, for example, includes an interface 300 to the RDBMS 126, an optional caching subsystem 302, and a script interpreter 304 for executing one or more SP/UDF scripts 130 retrieved from a table 134 maintained within the RDBMS 126, independent of the file I/O system. No dispatcher is required for the VAB-II runtime module 128 in the database server 122. The interface 300 provides a mechanism for invoking the RDBMS 126 from the VAB-II runtime module 128. As in the network server 110, the caching subsystem 302 exists to help manage special purpose object persistence. The script interpreter 304 executes the p-code or source code for the SP/UDF script 130 retrieved from the table 134. The code in this table is backed up along with the rest of the data stored in the RDBMS 126, and can be accessed by databases running under a wide variety of differing operating systems.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
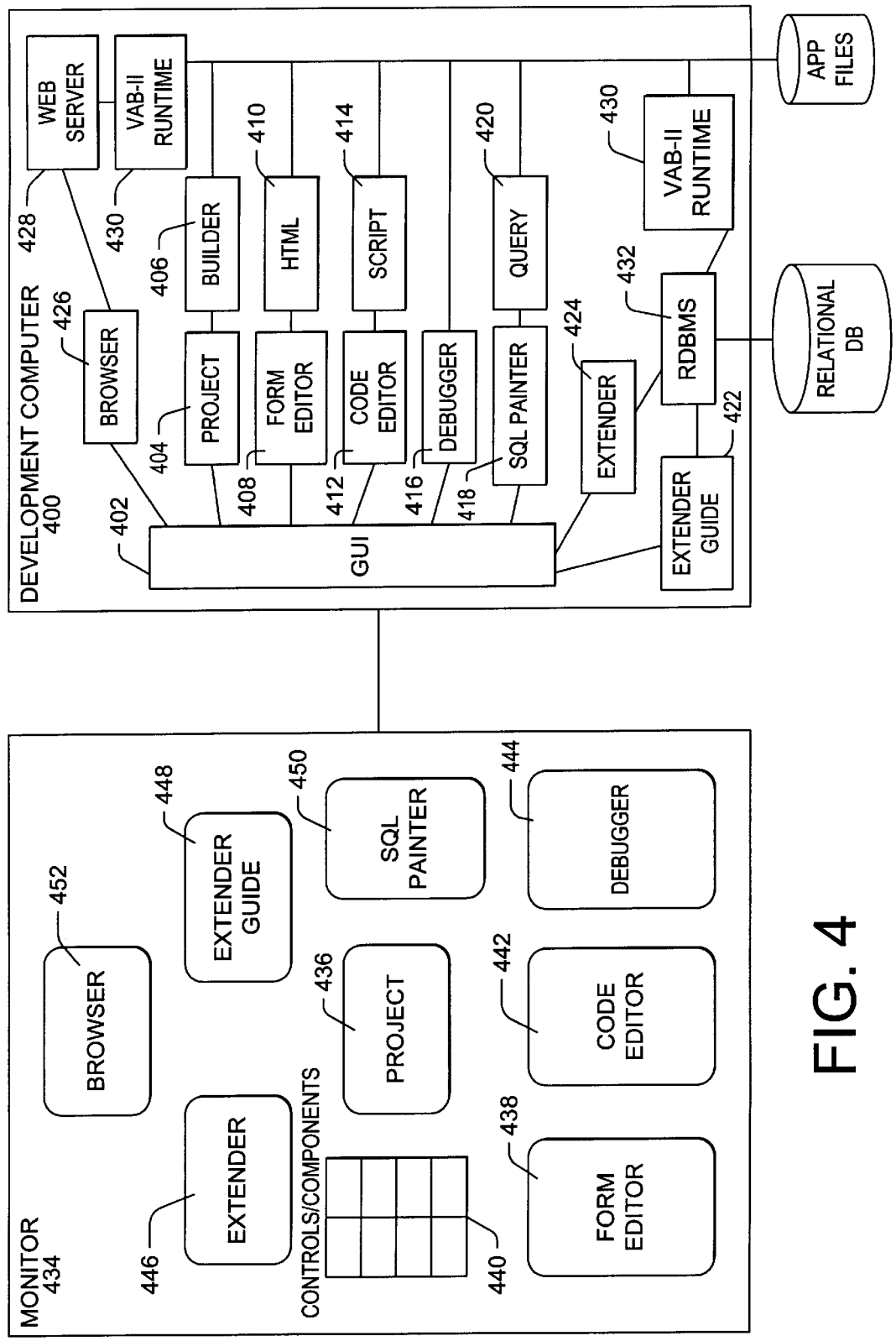
FIG. 4 is a block diagram that illustrates the development environment of one embodiment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS module 432. The RAD tool displays a user interface on a monitor 434 attached to the development computer 400, which includes, inter alia, a project window 436, form editor window 438, control pad 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Component-Neutral Builder Interface

Figure 5:
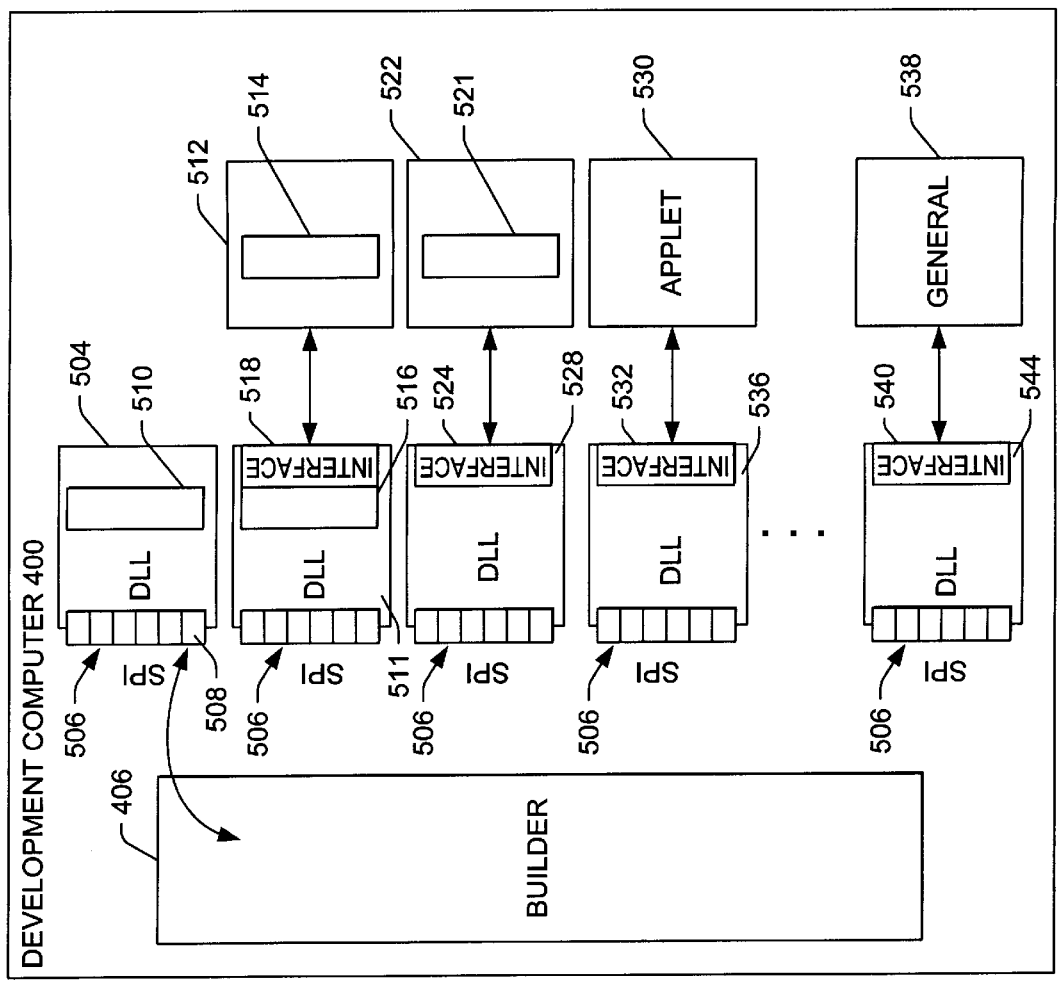
FIG. 5 is a block diagram that illustrates component-neutral builder interface of one embodiment of the present invention.
Figure 5:
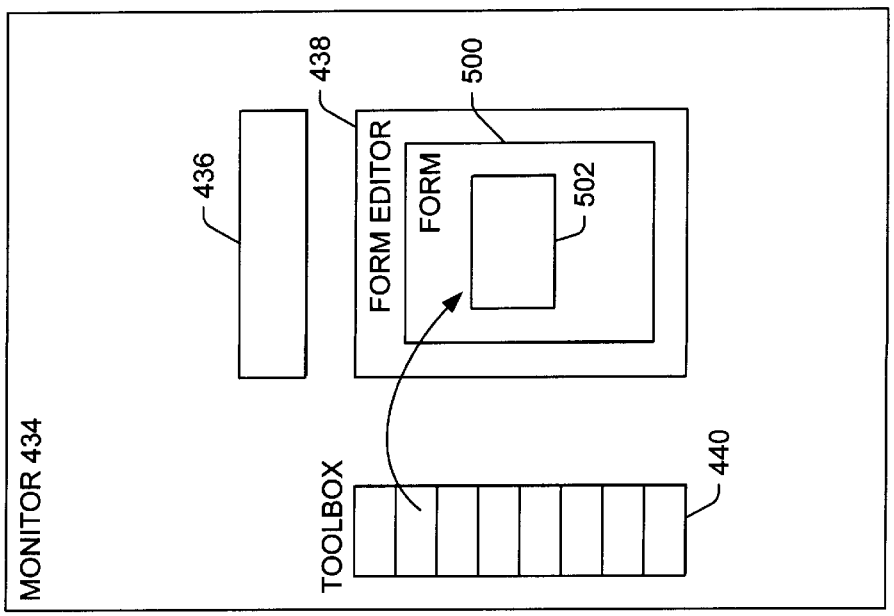

FIG. 5 is block diagram illustrating the operation of one embodiment of the component-neutral builder interface of the present invention. As shown in FIG. 5, a builder 406, one or more dynamic link libraries (DLLs) 504, 518, 524, 536, 544 and one or more components 510, 512, 522, 530, 538 are implemented in a development computer 400. A monitor 434, communicatively coupled to the development computer 400 displays a controls/components in a toolbox 440 to the user in connection with a particular project displayed in the project window 436. Components or controls from the toolbox 440 can be selected and dragged to a form 500 displayed in a form editor window 438 on the monitor 434.

The present invention enables any type of component to be used with the visual builder 406, even user-definable component types which have yet to be developed. This is accomplished because VAB-II runtime module 116 defines a "control" or a "component" as a dynamic link library (DLL) that supports a specific interface. This allows the developer to define a new control or component, simply by implementing a DLL that supports the interface. The builder 406 thus allows addition of "third party" controls, just as other builders do. However, unlike other systems, the present invention does not enforce requirements as to what kind of control or component can be implemented. The DLL that is used can be a "front end" to any type of component.

DLL 504 comprises a component-neutral system programming interface (SPI) 506, which enforces a command/communication protocol with elements 508 between the DLL 504, 518, 528, 536, and 544 and the builder 406. Generally, components can be implemented with one or more instruction sets. In one embodiment, instruction set 510 is implemented in the DLL 504 itself. Any number of components, each from the same or different sources, and each with a different interface protocol can implemented this way. The functionality implemented by the SPI 506 is discussed further herein with respect to TABLES 1, 2, and 3.

TABLE 1 presents a list of component data elements, including an array of default property values for the control, an array of events supported by the control, the name of the control (e.g. "button"), and version information for the control. Generally, events and their signatures are predefined, and new "events" cannot be invented. An event list may include, for example, "onLoad," "click," and "MouseOver" as events. The component/control defines how it keeps track of instances. In one embodiment, the component/control keeps a doubly-linked list of control instance objects off of an anchor. In cases where no more than one request will be handled by the DLL at a time, this list does not require serialization.

TABLE 2 presents a list of component interface elements which individually, in combination, or in whole, represent command set defining an interface protocol between the builder 406 and the and the components 510, 512, 522, 530, and 538, through DLLs 504, 517, 528, 536, and 544, respectively. TABLE 3 presents a list of internal functions that may be optionally implemented in the DLL.

The getName( ) element is invoked by the builder 406 to determine the name of the component 504, which is the name which will appear in the toolbox 440.

The getPropertyList( ) element returns the list of default properties for the component. Since some properties are only settable at build time (and not run time) this property list may be qualified as such.

The getVersionData( ) element returns information about the component. In one embodiment, this data is stored or presented in the accepted form as VersionX.Y, where X represents major revisions, and Y represents minor revisions. This version control feature is invoked to determine if version incompatibility problems between the builder 406 and the component 510 exist.

In one embodiment of the invention, every time a component is used, two instances of the component are created, each having properties that can be independently selected. Although it would not necessarily affect component implementation or function, the createInstance( ) element is called by the builder 406 to tell the DLL 504 that another instance of the same DLL 504 is being created.

The setProperty( ) element is called by the builder 406 to set a property (or property range if the property is an array). This may occur, for example, when the builder 406 tells the control 510 it has changed a property (such as changing the background color). In one embodiment, if the property is a property array, the special variables (startRange and endRange) are used to identify the first value to change and the last value to change, respectively. If the property is a property array and startRange=endRange≧0, then only one value in the array (which starts with 0) need be set. If startRange<0, then the entire property array is replaced with new values. Other schemes can be employed wherein particular elements of the property array are specified to effect replacement of elements only when required.

The setPropertyChangedCallBackPtr( ) element is used if a property is changed. Where the component does not change properties by itself (in which case, it would be merely informed about property changes made by the builder 406), this element is not needed. However, when a component 510 changes a property, this element is used to inform the builder 406 that the component 510 has done so.

The getProperty( ) element is used by the builder 406 to obtain the value for a property from a particular component instance. This feature is useful primarily in testing, since the builder 406 normally has a separate copy of the component 510 properties. As such, it operates much as a component 510 viewer, allowing users to write new controls.

The generateHTML( ) element is used to generate HTML or other coded instructions for the component 510. Because this is accomplished in the DLL 504, and the builder 406 is in its EXE, storage of the generated HTML is accomplished in the DLL 504 via Windows Win32 GlobalAlloc and GlobalLock and the builder 406 frees storage using GlobalUnlock and GlobalFree or other memory allocation schemes on other operating systems.

One feature of the present invention is the ability for the designer to implement the component in various ways. In one embodiment, the component 512 is implemented in both the DLL 517 in a first instruction set portion 516, and in external component 512 in second instruction set portion 514. Communication between the external component 512 and the DLL 517 are provided via a DLL-component interface 518 implemented by an DLL-component interface instruction set. Interface 518 translates messages and commands from the DLL 517 to the component 512, and from the DLL 517 to the component 512.

In another embodiment, the external component 522 is implemented by an instruction set 521 residing in the component itself. In this case, communications and translation of messages and commands is performed by interface 524, if required. Alternatively, the DLL 528 can be specially designed for the component 522 so that no interface 524 is required.

The foregoing can be used to support the integration of a wide variety of control types and structures with the functions performed by the builder 406, including applets 530 written in JAVA, or any general component 538, including ActiveX and VBX components. In any of these cases, DLLs 504, 517, 528, 536, and 544 present the same SPI 506 to the builder. Where a developer wishes to create a new component model type, a new DLL is created and thereafter invoked, thusly implementing the SPI 506.

Figure 6:
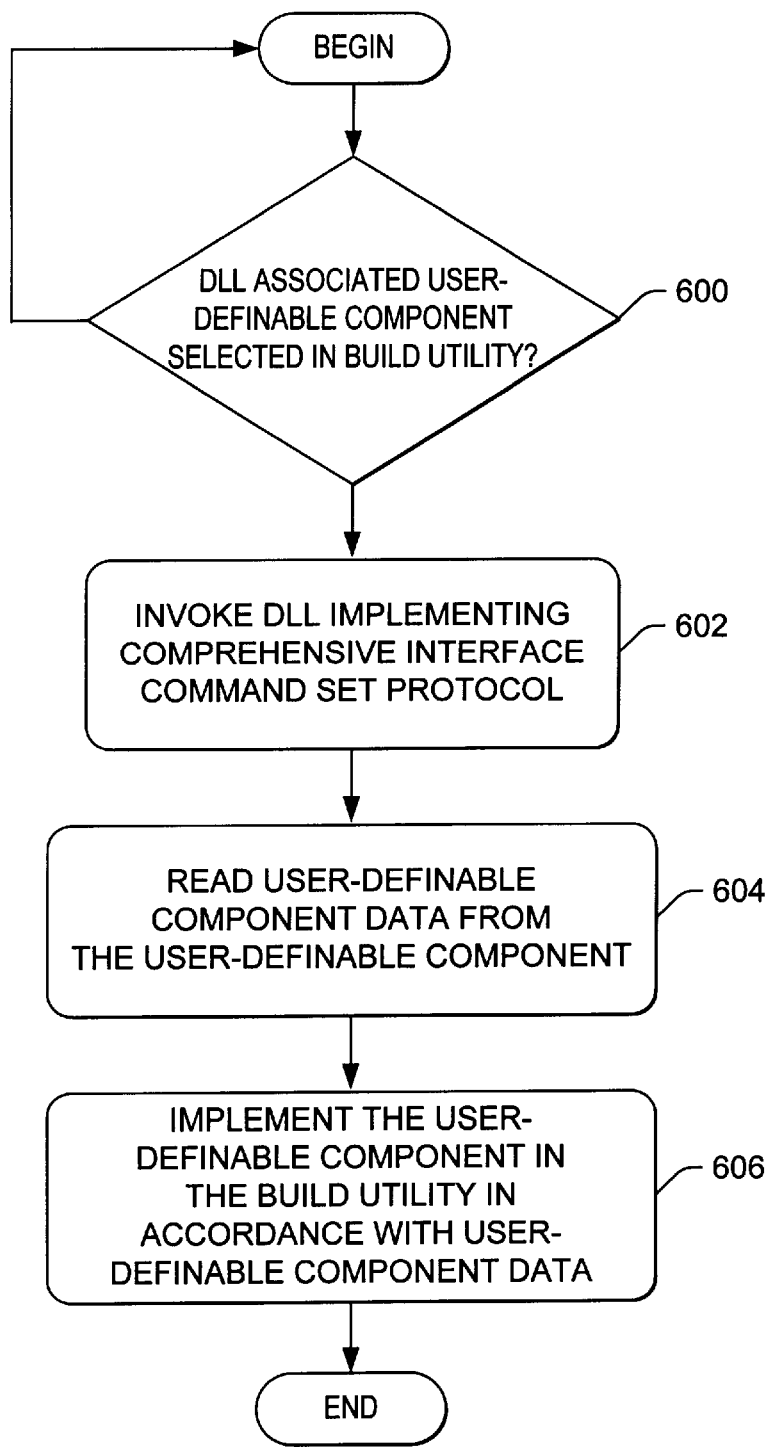
FIG. 6 is a flow chart illustrating an overview of the operations performed in one embodiment of the present invention.

FIG. 6 is a flow chart illustrating the method steps employed in practicing the present invention. First, when a user-definable component 510 is selected in the builder 406 or other utility, the DLL associated with that user-definable component is invoked. This is shown in blocks 600 and 602, respectively. Next, component 510 data is read 604 from the user-definable component. The commands for obtaining this data and the associated protocol is defined above with respect to TABLES 1, 2, and 3. Then, the user-definable component 510 is implemented in the builder 406, in accordance with the data read from the component 510. This is shown in block 606.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or stand-alone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

TABLE 1

| Element | Content |
| --- | --- |
| PropertyList | Array of default property values for components/controls of this type. Uses "charm"as a property array, supporting "Standard Methods"without necessity of declaring methods. |
| EventList | Array of events supported by control. Events and signatures are normally predefined, precluding creation of new events. |
| theName | The name used for this component/control type |
| theVersion | Version information for the component/control |

TABLE 2

| CNBI Element | Component (External) Function Description |
| --- | --- |
| DllMain() | Called by operating system, such as WINDOWS when the DLL is initialized, when a thread attaches, and at other times when necessary. |
| getName() | Returns the name of the component. |
| getPropertyList() | Returns the list of default properties. |
| getMethodList() | Returns the list of methods supported ("Standard Methods" need not be declared). |
| getEvenList() | Returns the list of events supported by the component. |
| getVersionData() | Returns version information about the component. |
| createInstance() | Called by builder to create a new component instance. Tracked to maintain data about each component instance that is used in painting the component. |
| deleteInstance() | Called by builder to notify that a component instance it created is going away. |
| setProperty() | Called by builder to set a property or range of properties if the property is an array. |
| setPropertyChangedCallBackPtr() | A component instance variable that supports calling a pointer if an property is changed. Not required if component does not change properties by itself. |
| getProperty() | Called by builder to get a property or range of properties if the property is an array. In one embodiment, function is optional and useful primarily for testing, because builder maintains properties in object model, and does not need to ask control for them. |
| generateHTML() | Generates HTML that represents the component. Usually, represents the component only, not the whole page. |
| winProc() | Invoked by builder to send Win messages, such as WM_PAINT or clicks, or others. The component's response to these messages is determined by the component design. In most cases, however, the component should paint when the Win message so commands. Internal version of this interface is also implemented to allow it to be called from inside the DLL and the builder. |

TABLE 3

| Internal DLL Function | Description |
| --- | --- |
| winProc() | Receives and handles WINDOWS messages. |
| addControlInstance() | Called when a new component (control) instance must be added to the list. |
| deleteControlInstance() | Called when a component (control) instance must be removed from the list. |
| findControlInstance() | Locates a control instance on the list. |
| findLastControlInstance() | Locates last control instance on the list. |
| findIndex() | Finds the index of a control on the list. |
| replaceProperty() | Replaces a property value and manages its storage. |
| makeNewDynamicPropertyList() | Creates a dynamic storage copy of the static property list. |
| freeDynamicPropertyList() | Frees dynamic storage in a dynamic property list (one created with createDynamicPropertyList()) |
| copyProperty() | Makes a dynamic storage copy of a property. |

What is claimed is:

1. An apparatus for interfacing a user-definable component with a computer-executable utility, comprising:
   a computer, comprising a memory and a processor communicatively coupled thereto;
   a dynamic link library (DLL) stored in the memory and executable by the computer, the DLL communicatively coupled to the user-definable component and the utility; and
   a program interface implemented in the DLL, the program interface enforcing an interface protocol between the component and the utility, the interface protocol having a command set including all interface commands for the user-definable component.

2. The apparatus of claim 1, wherein the DLL comprises an instruction set for implementing the component.

3. The apparatus of claim 1, wherein an instruction set implementing the component comprises a first portion implemented in the DLL and a second portion implemented in the component.

4. The apparatus of claim 1, wherein the DLL comprises a component interface for translating communications between the component and the DLL.

5. The apparatus of claim 1, wherein the command set includes a command for generating coded instructions in the component and transmitting the coded instructions from the component to the utility via the DLL.

6. The apparatus of claim 1, wherein the command set further comprises a command for retrieving data from the user-definable component via the DLL.

7. A method of implementing a user-definable component in a build utility, comprising:
   invoking a dynamic link library (DLL) when a user-definable component associated with the DLL is selected in a build utility, the DLL implementing an interface command set having all interface commands for the user-definable component;
   reading user-definable component data from the user-definable component via the DLL; and
   implementing the user-definable component in the build utility in accordance with the user-definable component data.

8. The method of claim 7, wherein the step of reading user-definable component data from the user-definable component comprises the step of reading component properties for the user-definable control via the DLL in response to the user-definable component parameter read command.

9. The method of claim 7, wherein the step of reading user-definable control data from the user-definable control comprises the step of reading an array of events supported by the user-definable component via the DLL in response to the user-definable component read command.

10. The method of claim 7, wherein the step of reading user-definable control data from the user-definable component comprises the step of reading a component name via the DLL.

11. The method of claim 7, wherein the step of reading user-definable control data from the user-definable component comprises the step of reading a component property list via the DLL.

12. The method of claim 7, wherein the step of implementing the user-definable control comprises the step of displaying the user-definable control on a display coupled to the computer in accordance with a user-definable control parameter.

13. The method of claim 7, wherein the command set comprises a command for generating coded instructions for the user-definable control, and the step of implementing the user-definable control comprises the step of generating coded instructions for the user-definable-control.

14. An article of manufacture comprising a program storage medium readable by a computer and embodying one or more instructions executable by the computer to perform method steps implementing a user-definable component in a build utility, the method comprising the steps of:

invoking a dynamic link library (DLL) when a user-definable component associated with the DLL is selected in a build utility, the DLL implementing an interface command set having all interface commands for the user-definable component, including a user-definable control parameter read command;

reading user-definable component data from the user-definable component via the DLL; and implementing the user-definable component in the build utility in accordance with the user-definable component data.

15. The article of manufacture of claim 14, wherein the method step of reading user-definable component data from the user-definable component comprises the method steps of reading component properties for the user-definable control via the DLL in response to the user-definable component parameter read command.

16. The article of manufacture of claim 14, wherein the method step of reading user-definable control data from the user-definable control comprises the method step of reading an array of events supported by the user-definable component via the DLL in response to the user-definable component read command.

17. The article of manufacture of claim 14, wherein the method step of reading user-definable control data from the user-definable component comprises the step of reading a component name via the DLL.

18. The article of manufacture of claim 14, wherein the step of reading user-definable control data from the user-definable component comprises the step of reading a component name via the DLL.

19. The article of manufacture of claim 14, wherein the command set comprises a command for generating coded instructions for the user-definable control, and the step of implementing the user-definable control comprises the step of generating coded instructions for the user-definable-control.

* * * * *